April 28, 1953     F. J. DI STEFANO     2,636,489
CHEMICAL WATER HEATER
Filed Aug. 21, 1951
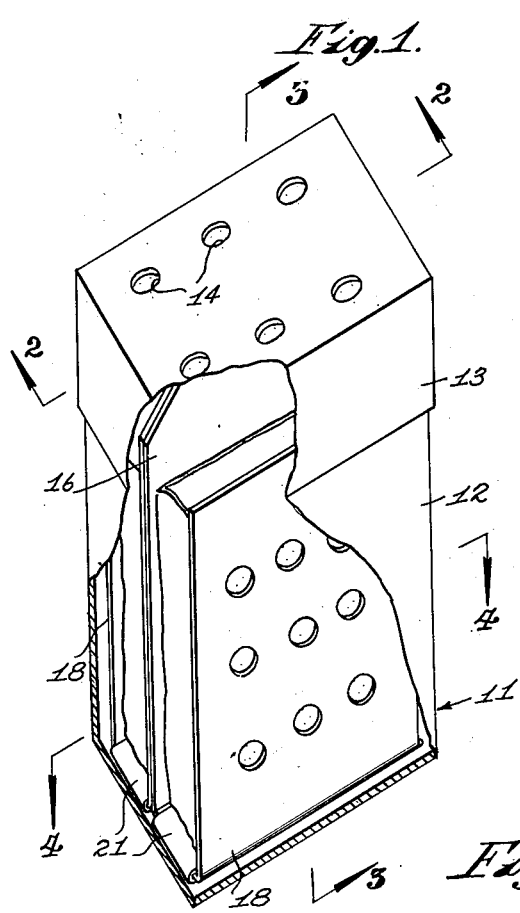
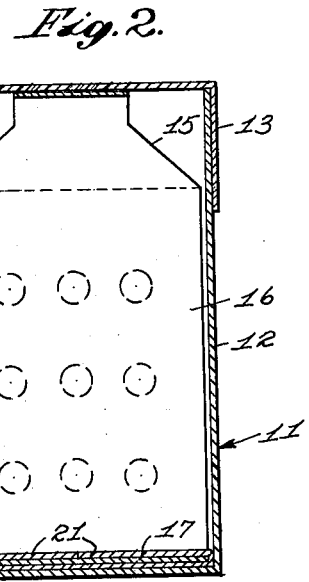
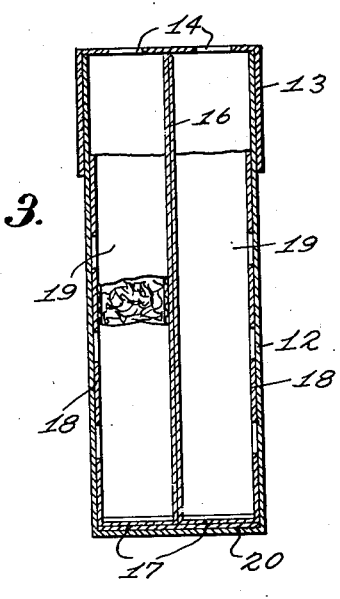
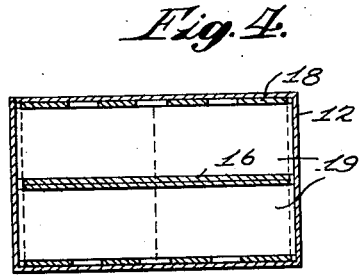
INVENTOR
FRANK J. DI STEFANO
BY McMorrow, Berman + Davidson
ATTORNEYS Patented Apr. 28, 1953

2,636,489

UNITED STATES PATENT OFFICE 2,636,489

CHEMICAL WATER HEATER

Frank Joseph Di Stefano, Brooklyn, N. Y.

Application August 21, 1951, Serial No. 242,857

3 Claims. (Cl. 126—263)

This invention relates to water heaters, and more particularly to a device for heating water, said device utilizing chemical heating means of the type comprising reagents which react together to produce heat when moistened with water.

A main object of the invention is to provide a novel and improved portable heating device which is simple in construction, which involves only a few parts, and which is particularly suitable for field use, as for example, members of the Armed Forces when engaged in maneuvers or other field activities, and when it is desired to heat water in a rapid and convenient manner without the necessity of building a fire.

A further object of the invention is to provide an improved chemical water-heating apparatus which is inexpensive to manufacture, which is very compact in size, which is light in weight, and which is easy to manipulate.

Further objects and advantages of the invention will become apparent from the following description and claims, and from the accompanying drawings, wherein:

Figure 1 is a perspective view, partly broken away, of an improved chemical water-heating apparatus constructed in accordance with the present invention;

Figure 2 is a vertical cross-sectional view taken on the line 2—2 of Figure 1;

Figure 3 is a transverse vertical cross-sectional view taken on the line 3—3 of Figure 1;

Figure 4 is a horizontal cross-sectional view taken on the line 4—4 of Figure 1.

Referring to the drawings, the heating apparatus is designated generally at 11. The apparatus comprises a rectangular outer container 12 provided with the removable flanged top cover 13. The top cover 13 is formed at its top wall with the spaced apertures 14 to allow free escape of gases from the interior of the container. Designated at 15 is a rack device slidably engaged in the container 12, said rack device comprising a central wall element 16 extending substantially to the top of the outer container 12, respective opposing horizontal flanges 17, 17 integral with and extending from the bottom edges of the wall element 16, and respective upstanding, perforated vertical flanges 18, 18 at the outer margins of the horizontal flanges 17, 17, whereby receptacles are defined on opposite sides of the wall element 16. Disposed in said receptacles are respective pads 19, 19 which are impregnated with chemicals of the type producing heat by exothermic reaction when moistened with water, such as for example, the pads of the type described in United States Patent 2,239,410, to H. Bonat, said pads being impregnated with suitable reagents which react together to produce heat when moistened with water. Such pads are well known per se and form no part of the present invention.

The top end of the upstanding wall element 16 tapers, as shown in Figure 2, to define a readily accessible handle for grasping the rack device 15 to remove said rack device from the container 12 when the cover 13 is disengaged from said container.

The opposing horizontal flanges 17, 17 are covered by a sheet metal liner 20 having top arms 21 covering the top surfaces of the flanges 17, 17, and serving to rigidify the lower portion of the rack structure 15.

In using the device, the rack 15 containing the pads 19, 19 is removed from the container 12 and is dipped into water to thoroughly moisten the pads 19, 19. The rack and moistened pads are then reinserted in the container 12 and the top cover 13 is placed thereon. The container 12 may then be inserted in the vessel of water to be heated, the chemical reactions produced by the moistened pads 19, 19 producing sufficient heat to raise the water in the vessel to a high temperature and to maintain said water heated for a substantial period of time thereafter. The exothermic reaction of the chemicals in the pads 19, 19 generates a substantial amount of heat very rapidly, and the generation of heat continues for a relatively long period of time, enabling a substantial quantity of water to be kept hot for a period of from twenty to thirty minutes. After the device has been used once in this manner, the pads 19, 19 may be replaced, enabling the device to be used for a subsequent water-heating operation.

While a specific embodiment of an improved chemical water-heating apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A chemical water-heating apparatus comprising a generally rectangular outer container, a removable perforated cap engaged on the top of said outer container, and a rack slidably engaged in said outer container, said rack being arranged to receive and support a plurality of heat-generating pads of the type producing heat by exothermic reaction when moistened, said rack comprising a central wall element extending to the top of the outer container, respective opposing horizontal flanges secured to the bottom edge of said wall element, and respective upstanding perforated flanges at the outer margins of said horizontal flanges defining receptacles for said pads on opposite sides of said central wall element.

2. A chemical water heating apparatus comprising a generally rectangular outer container, a removable perforated cap engaged on the top of said outer container, and a rack slidably engaged in said outer container, said rack being arranged to receive and support a plurality of heat generating pads of the type producing heat by exothermic reaction when moistened, said rack comprising a central wall element extending to the top of the outer container, respective opposing horizontal flanges secured to the bottom edge of said wall element, and respective upstanding perforated flanges at the outer margins of said horizontal flanges defining receptacles for said pads on opposite sides of said central wall element, the top end of said central wall element tapering in width to define a handle for grasping the rack to remove the rack from the outer container.

3. A chemical water heating apparatus comprising a closed outer container having apertures in the top thereof and a rack slidably disposed in said outer container, said rack being arranged to receive and support a plurality of heat generating pads of the type producing heat by exothermic reaction when moistened, said rack comprising a central vertical wall element, respective opposing horizontal flanges secured to the lower portion of said wall element, and respective upstanding flanges at the outer margins of said horizontal flanges defining receptacles for said pads on opposite sides of said central wall element.

FRANK JOSEPH DI STEFANO.

References Cited in the file of this patent

UNITED STATES PATENTS

| Number | Name | Date |
| --- | --- | --- |
| 366,709 | Amoore | July 19, 1887 |
| 1,088,926 | Radlein et al. | Mar. 3, 1914 |
| 1,498,963 | Haber | June 24, 1924 |
| 2,239,410 | Bonat | Apr. 22, 1941 |
| 2,300,793 | Martin | Nov. 3, 1942 |

FOREIGN PATENTS

| Number | Country | Date |
| --- | --- | --- |
| 480,066 | France | Mar. 21, 1916 |